(12) United States Patent
Besnard et al.

(10) Patent No.: US 6,269,832 B1
(45) Date of Patent: Aug. 7, 2001

(54) DEGASSING CIRCUIT FOR LIQUID TANK

(75) Inventors: Pierric Besnard; Alain Iribarne; Patrick Ganachaud, all of Laval (FR)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/205,179

(22) Filed: Dec. 4, 1998

(30) Foreign Application Priority Data

Dec. 8, 1997 (FR) .................................................. 97 15679

(51) Int. Cl.⁷ .................................................. B65D 25/00
(52) U.S. Cl. .................................................. 137/137; 137/587
(58) Field of Search .................................. 137/587, 135, 137/137

(56) References Cited

U.S. PATENT DOCUMENTS

| | | | |
|---|---|---|---|
| 1,025,608 | * 5/1912 | Bliss | 137/135 |
| 3,800,978 | 4/1974 | Sigwald | 137/587 |
| 3,822,715 | * 7/1974 | Rao | 137/135 |
| 4,700,864 | 10/1987 | Galles et al. | 220/86 R |
| 4,958,655 | * 9/1990 | Danek | 137/587 |
| 5,215,132 | * 6/1993 | Kobayashi | 137/587 |

FOREIGN PATENT DOCUMENTS

| | | |
|---|---|---|
| 2 223 205 | 11/1973 | (DE) . |
| 2 561 594 | 9/1985 | (FR) . |
| 2 254 847 | 10/1992 | (GB) . |

* cited by examiner

*Primary Examiner*—A. Michael Chambers
(74) *Attorney, Agent, or Firm*—Larson & Taylor

(57) ABSTRACT

Degassing circuit for a liquid tank, including a degassing duct connecting the upper part of the tank to a higher point, close to the upper end of the filling duct, via a section in the form of a syphon and a liquid/gas separating volume provided at its base with a device for purging the liquid phase present in the degassing duct, in which the purging device brings the degassing duct into communication with the filling duct and is combined with a device creating a Venturi effect conducive, when filling, to purging the liquid phase present in the degassing duct.

7 Claims, 2 Drawing Sheets

DEGASSING CIRCUIT FOR LIQUID TANK

Figure 1:
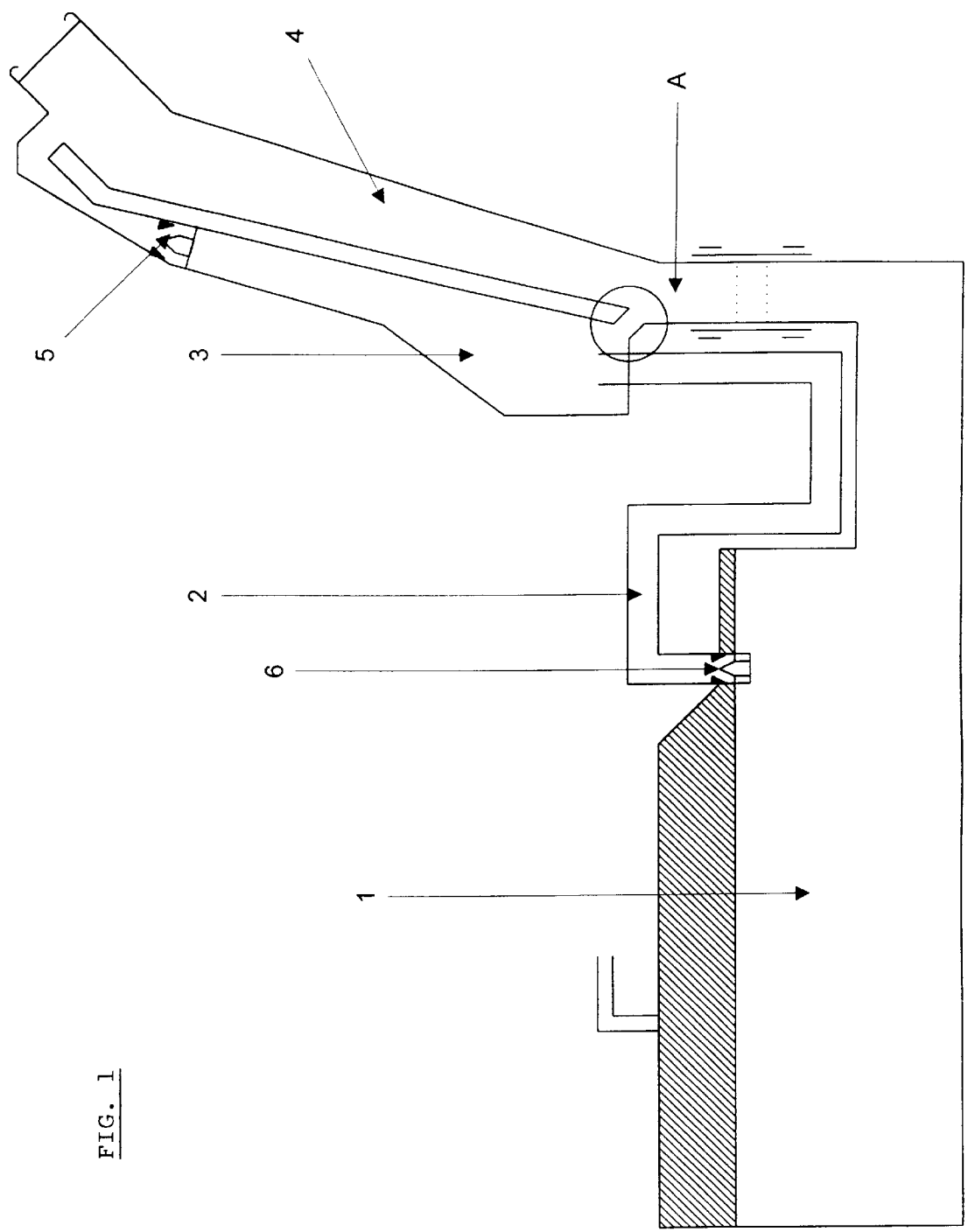

The present invention relates to a degassing circuit for a liquid tank, in particular for a fuel tank equipping a motor vehicle. Liquid tanks, in particular fuel tanks for motor vehicles, generally comprise a degassing circuit. This circuit allows the air and gases present in the tank during filling to be removed. It generally terminates in the upper part of the filling duct. It often comprises a liquid/gas separating volume which is sometimes provided with a purging device.

For reasons of space and, in particular of internal design of the vehicle, this degassing circuit may have a section in the form of a syphon. This syphon can fill with liquid when completely filling the tank or in use, when the vehicle is on an incline or when waves are created in the tank. This liquid may be forced back into the liquid/gas separating volume and cause ejections when filling the tank and removing the gases that it contains. These ejections are undesirable for the person filling the tank. They may furthermore be prejudicial to safety and to the environment and are counter to current concerns with regard to the emission of hydrocarbons from motor vehicles.

Moreover, expulsion of the liquid contained in the syphon requires a pressure which depends on the height of the liquid. This pressure, if it is too high, may cause, even before it is expected, the premature tripping of the filling device (for example the delivery nozzle) and thereby cause an undesirable interruption in the filling operation.

It is therefore necessary to allow the liquid contained in the syphon-shaped section of the filling duct to drain away, so as not to cause ejections or undesirable tripping of the filling device.

According to French Patent Application 2,561,594, the lower part of the syphon of a degassing duct for a fuel tank is connected to this tank, at a level below the maximum filling level of the tank, by an orifice of small cross section. When the liquid level in the tank falls below the low point of the syphon, any fuel present in the latter drains away into the tank. The degassing circuit is therefore entirely free of liquid before each filling operation. However, this solution cannot be envisaged for all geometries and for all positions of the syphon. Furthermore, by putting the degassing duct into communication with the tank at a level below the maximum liquid level, there is a risk of the liquid flowing back into the degassing duct and, consequently, the above-mentioned risk of fuel being ejected. When a float valve is added to solve the problem, the device in question is made more complex for a minimum result and no longer allows the fuel contained in the degassing circuit to drain away during the end of the filling operation, thus the risk of fuel ejections at this point remains.

The object of the invention is to provide a degassing circuit for a liquid tank comprising a section in the form of a syphon and a liquid/gas separating volume provided with a purging device of improved design, not requiring the use of a valve or of any other mechanism intended for draining any liquid contained in the syphon.

The invention therefore relates to a degassing circuit for a liquid tank comprising a degassing duct connecting the upper part of the tank to a higher point, close to the upper end of the filling duct, via a section in the form of a syphon and a liquid/gas separating volume provided at its base with a device for purging the liquid phase present in the degassing duct, in which the purging device brings the degassing duct into communication with the filling duct and is combined with a device creating a Venturi effect conducive, when filling, to purging the liquid phase present in the degassing duct.

The term "degassing circuit" should be understood to mean the device which, when filling the tank, allows the gases that it contains to be removed.

The degassing circuit may be external or, completely or partly, internal to the liquid tank.

The degassing circuit is intended for any liquid tank. However, it is advantageously fitted to a tank for motor vehicles. Excellent results have been obtained when the liquid tank is a fuel tank.

The degassing circuit may consist of one or more elements made of one or more materials, and in particular made of thermoplastic. Advantageously, the degassing duct is based on one or more thermoplastics. The term "thermoplastic" should be understood to mean one or more thermoplastic polymers. The polymers may be homopolymers, copolymers or blends thereof. By way of example of such polymers, polyolefins, polyamides or fluoro polymers may, for instance, be used. Good results have been obtained from high-density polyethylene.

One or more standard additives such as antioxidants, stabilizers, pigments or the like may, of course, be added to the thermoplastic.

The geometry, configuration and dimensions of the section in the form of a syphon of the degassing circuit are tailored in a known manner to the space available and to the design of the environment external to the tank, and likewise to the operating requirements.

The liquid/gas separating volume is close to the filling duct. Advantageously, it may be moulded as one piece with the latter. In general, the degassing duct communicates with the filling duct via an orifice at the base of the liquid/gas separating volume.

The purging device is placed at the base of the liquid/vapour separating volume. Advantageously, it is placed at a level above the maximum filling level of the tank, thus allowing the degassing duct to be purged even when the tank is filled to the maximum.

The device creating a Venturi effect may be produced in any known manner. Advantageously, it consists of a narrowing of the filling duct at the point where it communicates with the degassing duct.

Beneficial results have been obtained when the degassing duct furthermore comprises at least one float valve. This type of valve generally comprises an enclosure which allows the gases to pass through it and a movable piece which slides in the latter in order to block off a connection orifice between two cavities. When the liquid rises in the cavity in which the movable piece is located and then reaches it, it floats on the surface of the liquid and, by sliding in the enclosure, blocks off the orifice for connection to the other cavity. A device for sealing the valve in its closed position is preferably combined with it.

A float valve may advantageously be placed in the upper part of the liquid/gas separating volume or between this upper part of the liquid/gas separating volume and the upper connection between the degassing duct and the filling duct. Thus, the risk of liquid being ejected when filling the tank and removing the gases that it contains is further reduced.

Favourable results have been obtained by placing a float valve at or near that end of the degassing duct which is on the tank side. This therefore reduces the risk of the syphon filling with liquid when completely filling the tank or in use, when the vehicle is on an incline or when waves form in the tank.

The degassing circuit as described above guarantees that the tank may be filled with liquid without any ejections or undesirable tripping of the filling device. It is therefore advantageously combined with a liquid tank.

The invention consequently also relates to a liquid tank equipped with a degassing circuit as defined above.

Figure 2:
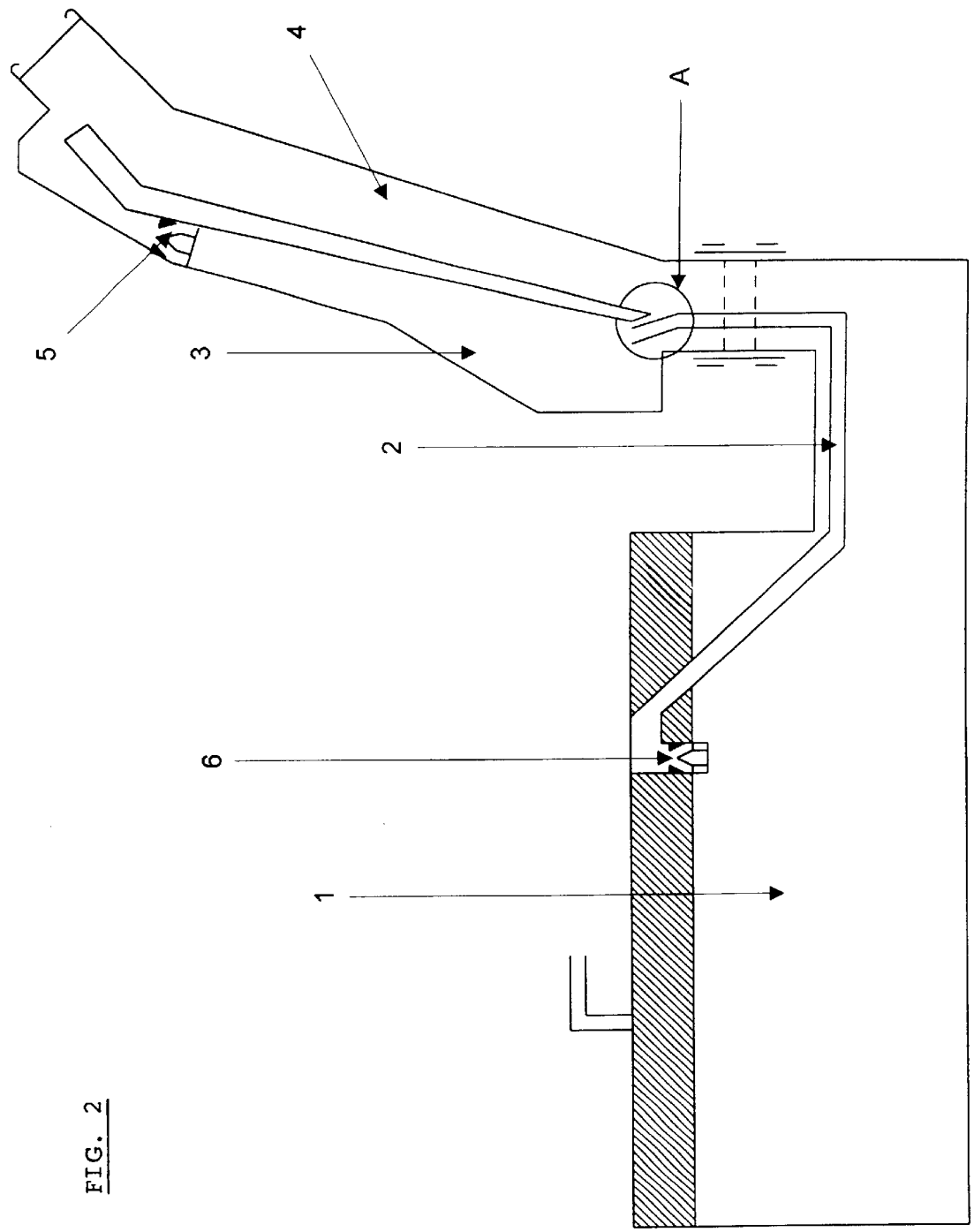

The invention is illustrated in a non-limiting manner by FIGS. 1 and 2.

FIG. 1 shows a degassing circuit according to the invention, external to the fuel tank for a motor vehicle and provided with two float valves.

The fuel tank (1) comprises a degassing circuit (2) which has a section in the form of a syphon and a liquid/gas separating volume (3). When filling the tank (1) via the filling duct (4), the gases contained in the tank are removed via the degassing circuit (2). The maximum filling level of the tank is such that it leaves above the liquid level a volume sufficient to allow the gases contained in the upper part of the tank to expand. When this maximum level is reached, the float valve (6) positioned at that end of the degassing duct which is on the tank side reduces the risk of liquid penetrating into the syphon. Likewise, in use, when the vehicle is on an incline or when waves are created in the tank, the valve (6) also reduces the risk of liquid penetrating into the syphon.

Despite the presence of the float valve (6), liquid may be driven into the degassing circuit and accumulate in the syphon or in the liquid/gas separating volume (3). In order to purge this liquid, a communication (A) connects the base of the liquid/gas separating volume (3) to the filling duct (4). The filling duct (4) has, at this communication (A), a narrowing which creates a Venturi effect conducive to purging the liquid phase when filling the tank (1).

Another float valve (5) positioned between the upper part of the liquid/gas separating volume and the upper connection between the degassing duct and the filling duct, reduces the risk of liquid being ejected from the filling duct when filling the tank and removing the gases that it contains.

FIG. 2 shows a degassing circuit according to the invention, internal to the tank and also comprising two float valves.

The method, of operation described above in the case of FIG. 1 also applies in the case of FIG. 2.

What is claimed is:

1. A degassing circuit for a liquid tank, comprising:

a tank which contains a liquid up to a maximum filling level, the tank including an upper part above the maximum filling level in which gases are trapped;

a filling duct connected to the tank, the filling duct including a Venturi section which creates a Venturi effect when liquid is introduced into the tank through the filling duct;

a liquid/gas separating volume adjacent the filling duct, the separating volume including a base and a purging device at the base through which liquid entering the separating volume is purged to the Venturi section of the filling duct; and a degassing duct connecting the upper part of the tank to a point of the separating volume which is higher than the upper part of the tank, the degassing duct having a siphon-shaped part;

whereby during filling of the tank with a liquid through the filling duct, any liquid present in the degassing duct and moved into the separating volume is drawn by the Venturi effect through the purging device and into the Venturi section.

2. The degassing circuit according to claim 1, in which the liquid tank is a fuel tank.

3. The degassing circuit according to claim 1, in which the purging device is placed at a level above the maximum filling level of the tank.

4. The degassing circuit according to claim 1, in which the Venturi section consists of a narrowing of the filling duct adjacent the purging device.

5. The degassing circuit according to claim 1, in which the degassing duct furthermore comprises at least one float valve.

6. The degassing circuit according to claim 5, in which a float valve is placed in one of a) an upper part of the liquid/gas separating volume or b) between an upper part of the liquid/gas separating volume and an outlet end of the degassing duct.

7. The degassing circuit according to claim 5, in which a float valve is placed at or near an inlet end of the degassing duct.

* * * * *